(12) United States Patent
Davidson et al.

(10) Patent No.: US 8,467,987 B1
(45) Date of Patent: Jun. 18, 2013

(54) METHODS AND SYSTEMS FOR TESTING MOBILE DEVICE BUILDS

(75) Inventors: Jeffrey Philip Davidson, Mountain View, CA (US); Guru Nagarajan, San Jose, CA (US)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 13/483,442

(22) Filed: May 30, 2012

(51) Int. Cl.
*G01P 21/00* (2006.01)

(52) U.S. Cl.
USPC .......... 702/108; 717/124; 717/125; 705/4.64; 705/35; 455/408; 455/67.11

(58) Field of Classification Search
USPC ................ 702/108; 715/734, 736; 717/124, 717/125, 126, 127, 131, 177, 171; 705/7.28, 705/4.64, 35, 26.1, 14.66, 44, 26.9; 707/770, 707/E17.014, E17.12; 455/67.11, 410, 408, 455/425; 714/38.1, 38.14, E11.207, E11.208; 709/203, 217, 223; 726/18, 19, 26, 28
See application file for complete search history.

(56) References Cited

U.S. PATENT DOCUMENTS

| | | | |
|---|---|---|---|
| 7,793,262 B2 | 9/2010 | Atkin et al. | |
| 8,024,400 B2 * | 9/2011 | Lin et al. | 709/203 |
| 2003/0070120 A1 | 4/2003 | Michael et al. | |
| 2005/0114838 A1 | 5/2005 | Stobic et al. | |
| 2009/0124250 A1 * | 5/2009 | Topaltzas et al. | 455/423 |
| 2009/0169008 A1 * | 7/2009 | Gonzales et al. | 380/270 |
| 2009/0177567 A1 * | 7/2009 | McKerlich et al. | 705/35 |
| 2009/0207745 A1 * | 8/2009 | Huq et al. | 370/252 |
| 2009/0254912 A1 * | 10/2009 | Roundtree et al. | 718/102 |
| 2010/0003923 A1 * | 1/2010 | McKerlich et al. | 455/67.11 |
| 2010/0076871 A1 | 3/2010 | Lloyd et al. | |
| 2010/0161506 A1 * | 6/2010 | Bosenick et al. | 705/347 |
| 2010/0262598 A1 * | 10/2010 | Koyama et al. | 707/723 |
| 2010/0262619 A1 * | 10/2010 | Zargahi et al. | 707/770 |
| 2011/0028145 A1 * | 2/2011 | Marsyla et al. | 455/425 |
| 2011/0078231 A1 * | 3/2011 | Oliver et al. | 709/203 |
| 2012/0173612 A1 * | 7/2012 | Vegesna-Venkata et al. | 709/203 |

* cited by examiner

*Primary Examiner* — Carol Tsai
(74) *Attorney, Agent, or Firm* — MH2 Technology Law Group, LLP

(57) ABSTRACT

A testing application may be executed on a mobile device associated with a mobile device build and may perform operations comprising: identifying a set of mobile applications designated for testing the mobile device build; for each mobile application in the set of mobile applications: receiving an indication that a user has selected the mobile application for execution; identifying a set of tests associated with the mobile application; for each test in the set of tests: prompting the user to perform an action specified by the test using the mobile application; prompting the user for feedback regarding performance of the action by the mobile application; receiving the feedback from the user; and storing the feedback received from the user.

19 Claims, 13 Drawing Sheets

METHODS AND SYSTEMS FOR TESTING MOBILE DEVICE BUILDS

TECHNICAL FIELD

The present disclosure relates generally to methods, systems, and computer-readable media for testing mobile device builds to determine whether they are capable of executing third-party mobile applications in a manner that satisfies one or more standards.

BACKGROUND

Recent advances in mobile device technology have led to an increasing degree of separation between the design and manufacture of mobile devices and the development of software intended to run on those mobile devices. For example, a software vendor may develop mobile device operating system software intended to run on multiple mobile devices manufactured by different device-makers. Furthermore, a large number of independent and diverse third-party application developers may develop mobile device applications ("apps") intended to execute on the mobile device operating system irrespective of the particular mobile device on which the operating system is installed.

Several challenges, however, may complicate the of enabling the same mobile device operating system and/or third-party mobile apps to execute in a similar manner across different mobile devices. For example, different mobile devices may possess different hardware architectures, such that certain operating system functions programmed to rely on a first hardware architecture may not operate correctly on a mobile device having a second hardware architecture. In addition, some mobile device operating systems are distributed using an open source model. As a result, some device-makers may modify the operating system before installing it on a retailed mobile device for the purpose of ensuring that it conforms to the specific hardware architecture of the mobile device and/or offers certain enhanced functionality over that of other mobile devices running the same operating system.

Still further, different mobile devices may be intended for consumer use with certain mobile network carriers, which may require that the mobile devices perform certain core operating system functions or higher level application layer functions in different manners. As a result of these and other complicating factors, third-party mobile apps that have been programmed with consideration only of the mobile device operating system on which they will execute may behave differently on different mobile device architectures, each of which may be running a different customized version of the same operating system.

Accordingly, there is a need for methods and systems for testing mobile devices having different hardware architectures, different intended carriers, and/or different modified versions of an operating system installed to ensure that they are able to meet certain standards for executing third-party mobile apps in a uniform or expected manner.

SUMMARY

The present disclosure addresses these and other needs in the area of mobile device testing. In some embodiments, a testing application may be executed on a mobile device associated with a mobile device build and may perform operations comprising: identifying a set of mobile applications designated for testing the mobile device build; for each mobile application in the set of mobile applications: receiving an indication that a user has selected the mobile application for execution; identifying a set of tests associated with the mobile application; for each test in the set of tests: prompting the user to perform an action specified by the test using the mobile application; prompting the user for feedback regarding performance of the action by the mobile application; receiving the feedback from the user; and storing the feedback received from the user.

Additional objects, advantages, and embodiments of the present disclosure will be set forth in part in the description that follows, and in part will be derived from the description, or may be learned by practice of the disclosed embodiments. The objects, advantages, and embodiments of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed. It is also to be understood that use of the word "exemplary" throughout the application is to be understood as providing examples that may be useful for illustrating general principles or concepts; thus, figures and descriptions identified as "exemplary" should not be interpreted as representing the best or only approaches to practicing the disclosed embodiments.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

Figure 1:
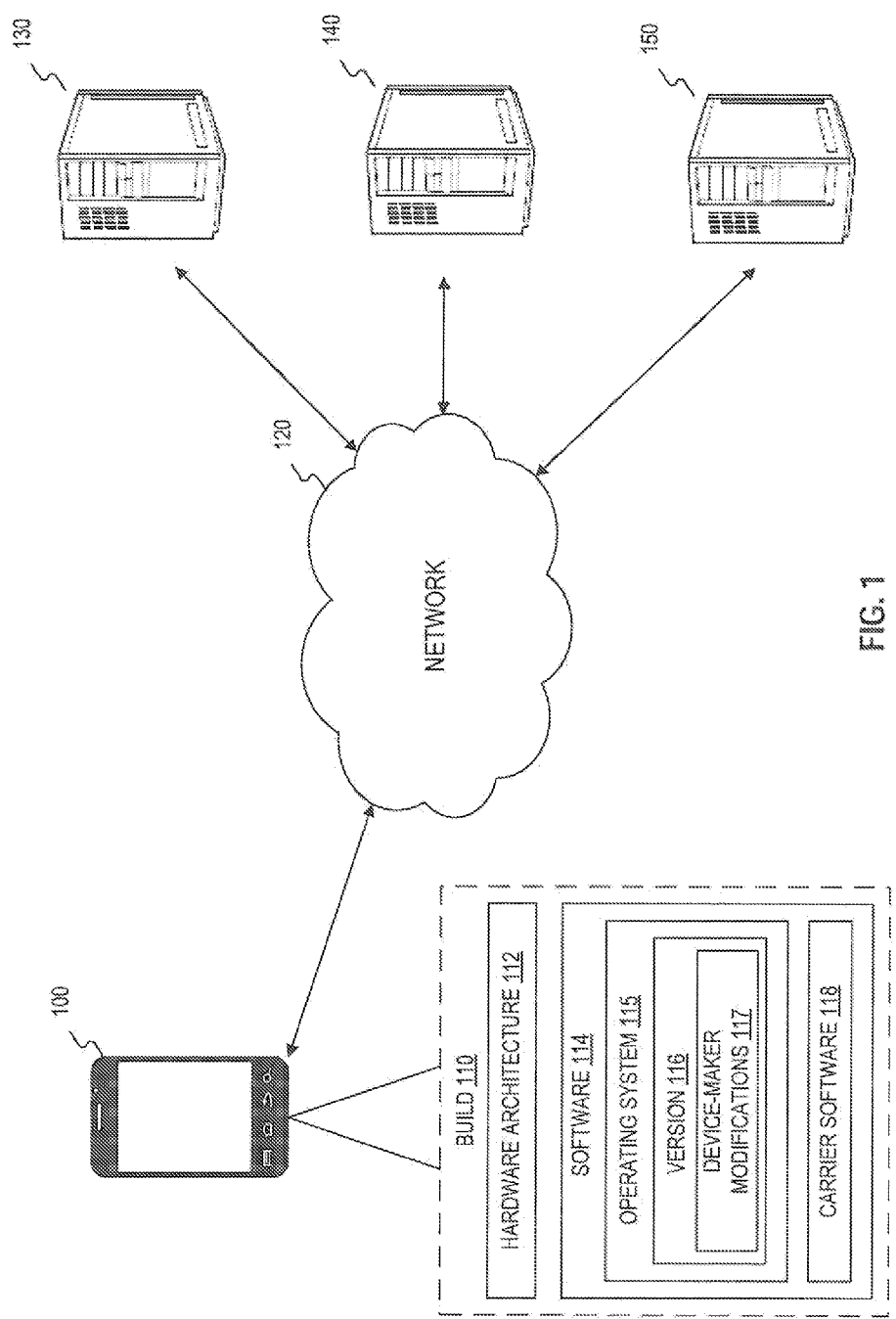
FIG. 1 is a diagram depicting an exemplary network arrangement in which a mobile device build may be tested for compatibility with one or more standards, consistent with certain disclosed embodiments.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting an exemplary network arrangement in which a mobile device build may be tested for compatibility with one or more standards, consistent with certain disclosed embodiments. As depicted in FIG. 1, a mobile device 100 may communicate via a network 120, such as the Internet, with one or more servers, such as a testing server 130, a mobile application download server 140, and an application server 150.

In some embodiments, mobile device 100 may be designed or manufactured by a mobile device-maker. Thus, mobile device 100 may be structured according to a particular hardware architecture 112 designed by the device-maker or associated entities. In addition to including a particular hardware architecture 112, mobile device 100 may be configured by software 114 (which, for ease of reference, may include firmware). Software 114 may include an operating system 115. Operating system 115 may generally refer to a particular mobile device operating system software product developed or distributed by a software vendor, such as the Android™ mobile device operating system marketed and distributed by Google.

Operating system 115 may further be defined by a particular version 116 of the operating system software product, such as Android[198] 4.01. Furthermore the operating system version 116 may include modifications 117 by the device-maker for the purpose of ensuring that the installed operating system is compatible with the mobile device 100's particular hardware architecture 112, includes additional functionality, or includes other modifications. In addition to operating system 115, in some embodiments, mobile device 100 may be configured by carrier software 118 installed to enable mobile device 100 to communicate using a particular wireless carrier, such as AT&T, Sprint, etc.

Together, a unique combination of hardware and software resident in mobile device 100 may be referred to as a build. Thus, as depicted in FIG. 1, mobile device 100 may be defined by a particular build 110 that includes the enumerated hardware and software components. In some embodiments, any material change to the hardware or software components of mobile device 100 may result in the mobile device being defined by a different build.

For example, the device-maker may compile a collection of source code to be installed on mobile device 100 that includes a version 116 of an operating system 115 obtained from a software vendor and a set of modifications 117 developed by the device-maker to create a build 110 for mobile device 100. However, at a later time, the device-maker may upgrade mobile device 100 to a new version 116 of the operating system 115, thus resulting in a new and different build 110. Or, in response to consumer feedback, the device-maker may fix one or more bugs introduced by its modifications 117. There compiling of the modified code may then constitute another, different build 110. In some embodiments, upon the creation of each new build, a new build fingerprint may be created or generated to uniquely identify the build, for example in the form of a distinct character string or bit sequence.

Those skilled in the art will appreciate other kinds of modifications to the hardware or software resident on mobile device 100 that may result in the creation of a new build 110. Those skilled in the art will also appreciate that build 110 could include different hardware and/or software components than those enumerated in FIG. 1.

Because any modification to the hardware or software configuration of mobile device 100 could potentially affect the operation of third-party mobile apps on mobile device 100, it may be desirable to test mobile devices for compatibility with one or more standards on a build-by-build basis. In some embodiments, the mobile device operating system vendor may provide a platform for testing and certifying builds using one or more testing servers 130. Exemplary operations performed by testing server 130 and one or more mobile devices 100 are further described in FIGS. 2-10.

Figure 2:
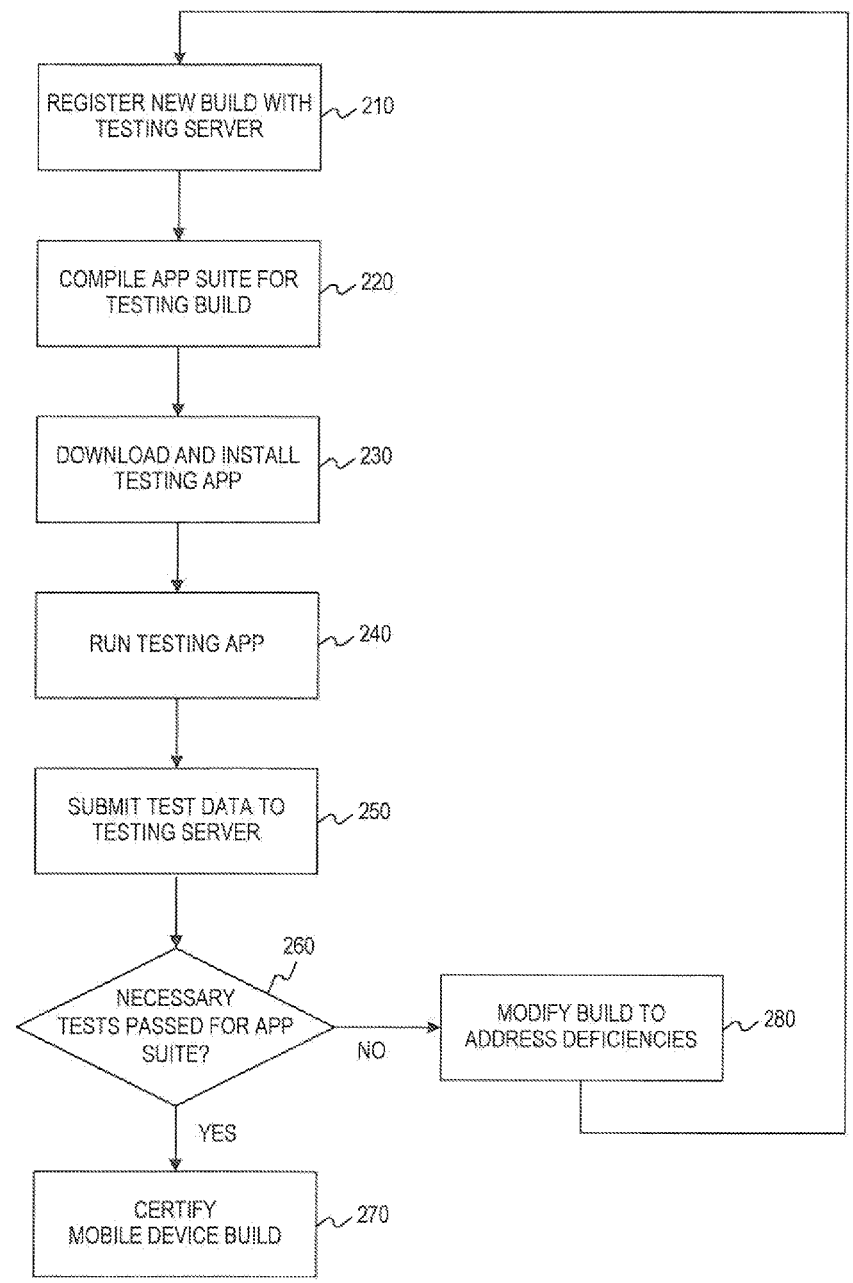
FIG. 2 is a flow diagram depicting an exemplary method of testing a mobile device build for compatibility with one or more standards, consistent with certain disclosed embodiments.

FIG. 2 is a flow diagram depicting an exemplary method of testing a mobile device build for compatibility with one or more standards, consistent with certain disclosed embodiments. The process may begin in step 210 when an mobile device-maker registers a new mobile device build with testing server 130. It some embodiments, testing server 130 may include a hypertext transfer protocol (HTTP) web server or other communications interface that enables device-makers to log into accounts hosted by testing server 130 and to register new builds for testing.

In step 220, the vendor may compile a list of third-party applications ("app suite") that may be used to test the build for compliance with one or more standards. The vendor may select one or more appropriate app suites according to a number of different criteria. In some cases, the vendor may have a standard app suite that all mobile device builds must pass in order to be certified as compliant with a basic compatibility standard with respect to an installed operating system. For example, the vendor may compile a standard app suite that is intended to ensure that a new build is able to perform certain core operating system functions appropriately. Such a standard app suite may include a first subset of third-party mobile apps that rely on certain communication features of the operating system, a second subset of third-party mobile apps that rely on certain graphics functions of the operating system, a third subset of third-party mobile apps that rely on certain digital camera features of the operating system, etc.

In addition or alternatively, the vendor may assign a particular app suite for a particular build based on hardware or software characteristics associated with the build. For example, if the mobile device associated with the build includes such hardware features, such as an accelerometer or gyroscope, then the vendor may include third-party apps in the app suite assigned to the build that rely on the proper functioning of the accelerometer or gyroscope, such as certain gaming apps. Or, if the device-maker has introduced certain modifications into the operating system code for the purpose of modifying or enhancing certain features of the operating system, then the app suite assigned to the build may include third-party apps that rely on the operating system features that were modified or enhanced to ensure that such features are still able to function properly after the modifications.

In some embodiments, an app suite may include a set of particularly popular third-party mobile apps to ensure that the mobile apps most likely to be installed on the mobile device by users would execute appropriately. Still further, in some embodiments, an app suite may be compiled for a build that includes third-party apps that would not be expected to operate properly on the build. Those skilled in the art will appreciate that multiple, different app suites could be compiled and assigned to a build based on the foregoing or other criteria.

Figure 3:
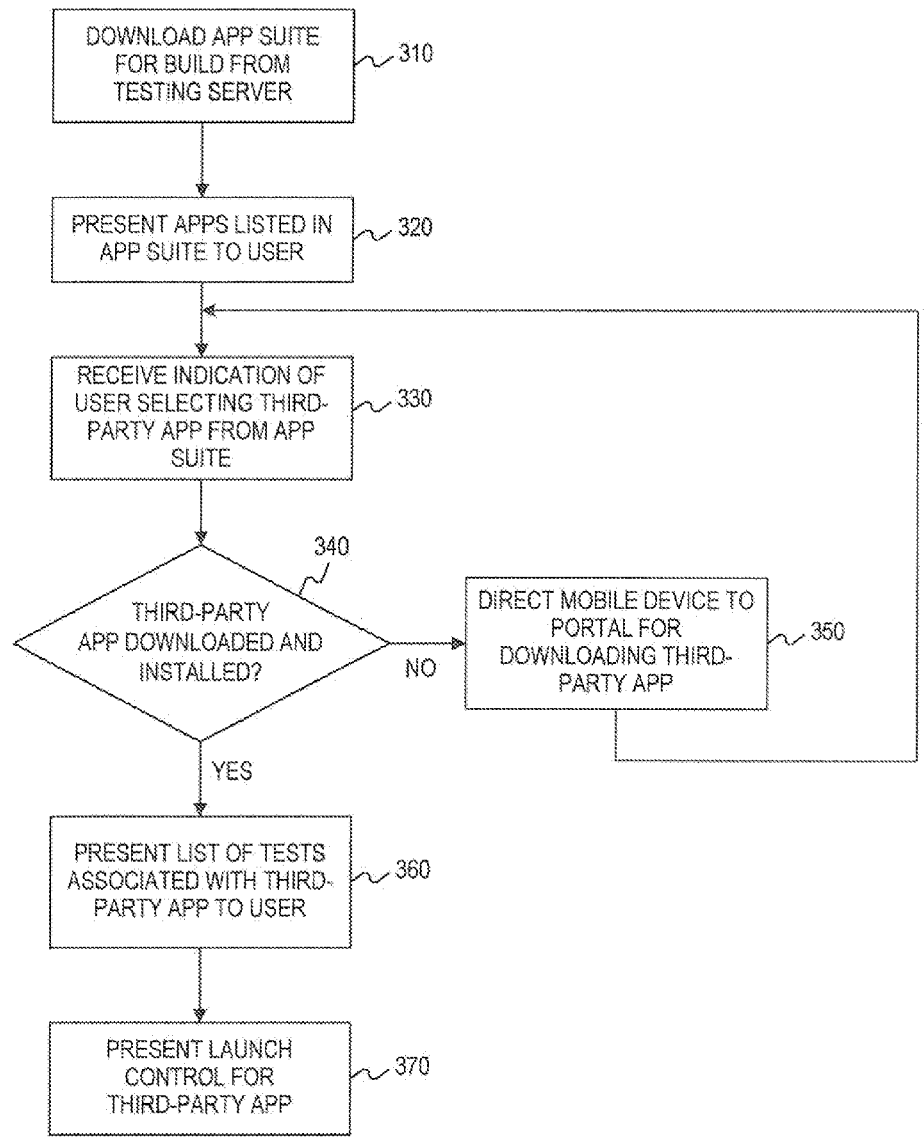
FIG. 3 is a flow diagram depicting an exemplary method of organizing and presenting a suite of mobile applications associated with a mobile device build for testing, consistent with certain disclosed embodiments.

In step 230, mobile device 100, as defined by build 110, may download and install a testing app. And, in step 240, mobile device 100 may run the testing app. FIG. 3 is a flowchart depicting operations by which build 110 may be tested using the testing app and mobile device 100.

In step 310, mobile device 100 may communicate with testing server 130 to download an app suite associated with build 110 for the purpose of testing build 110. In some embodiments, the downloaded app suite may be a simple data structure, such as a text delimited file that includes a list of third-party app names or identification codes and text descriptions of tests that are to be performed using such third-party apps. In step 320, the testing app may present a list of the third-party apps contained in the app suite to a user.

Figure 4:
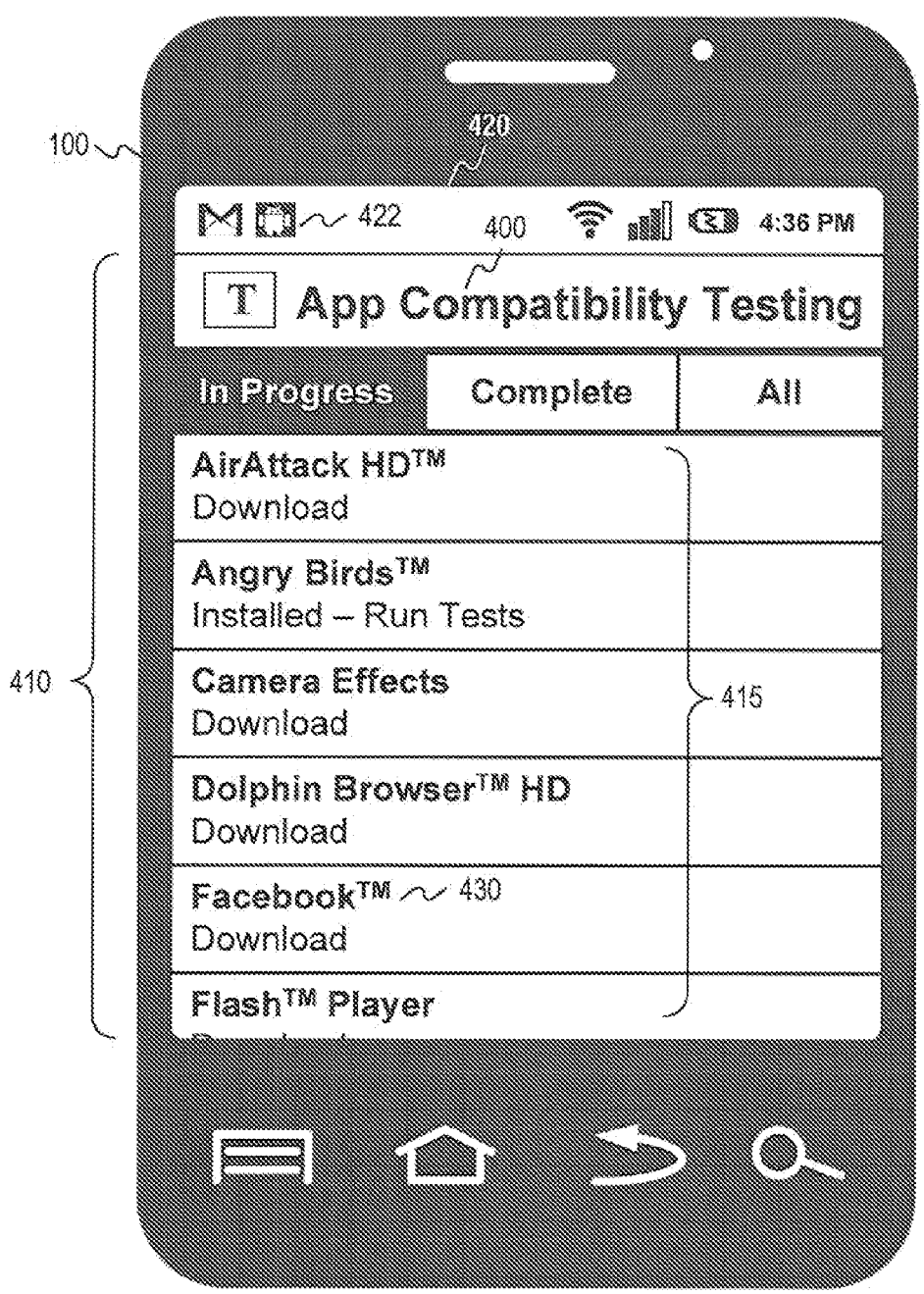
FIG. 4 is a diagram depicting an exemplary user interface in a testing application for presenting a suite of mobile applications associated with a mobile device build for testing, consistent with certain disclosed embodiments.

FIG. 4 depicts an exemplary testing app 400 operating on mobile device 100, as defined by build 110. As described with respect to FIG. 1, build 110 may itself be defined by the hardware architecture 112 of mobile device 100, version 116 of operating system 115, including device-maker modifications 117, and carrier software 118. As depicted in FIG. 4, operating system 115 may provide for the display of a notification bar 420 such that, when operating in the foreground, testing app 400 may consume only a portion of the full display screen offered by mobile device 100.

Notification bar 420 may provide information about the operation of mobile device 100, such as its wireless connection status, received signal strength, battery status, and time of day. In addition, in some embodiments, notification bar 420 may also provide for the display of certain icons 422 intended to notify a user that an event has occurred and to provide the user with a mechanism for obtaining more information about the event or responding to the event.

As depicted in FIG. 4, upon initial launch of testing app 400 (e.g., after downloading an appropriate app suite), mobile device 100 may display a home screen 410. Home screen 410 may include a list 415 of some or all third-party apps included in the app suite. Next to each app name, a status label may be displayed indicating whether the app has been downloaded or installed, whether testing using the app has begun, etc.

If a user next taps a listed app, in step 330, testing app 400 may receive an indication of the user selecting a third-party app from the app suite. In response to the indication, testing app 400 may determine whether the selected third-party app has already been downloaded and installed (step 340). If the third-party app has not already been downloaded and installed (step 340, No), then testing app 400 may direct mobile device 100 to a portal or other location from which it can download and install the selected third-party app (step 350). For example, as depicted in FIG. 1, testing app 400 may direct mobile device 100 to connect to mobile application download server 140, which may host a mobile app marketplace or other portal that allows users to download to install third-party mobile device apps.

Figure 5:
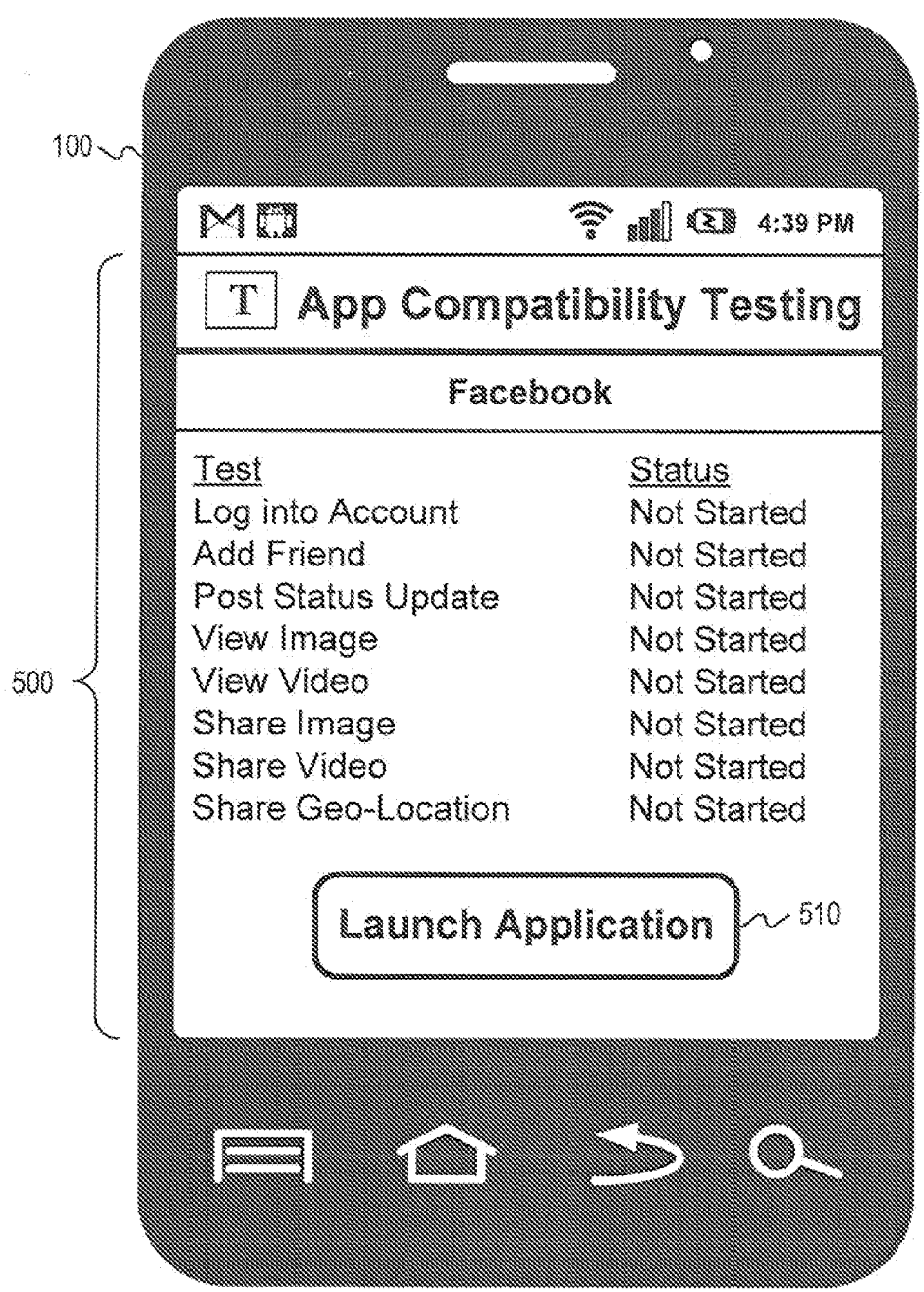
FIG. 5 is a diagram depicting an exemplary user interface in a testing application for presenting a set of tests for a mobile application for testing a mobile device build, consistent with certain disclosed embodiments.

Alternatively, if the selected third-party app has already been downloaded and installed (step 340, Yes), then testing app 400 may present an app status screen 500, as depicted in FIG. 5. In some embodiments, app status screen 500 may display a list of tests needed to be performed using the selected third-party app, as well as the status of each test (step 360). In addition, app status screen 500 may present a launch control, such as button 510, for launching the third-party app (step 370).

Figure 6:
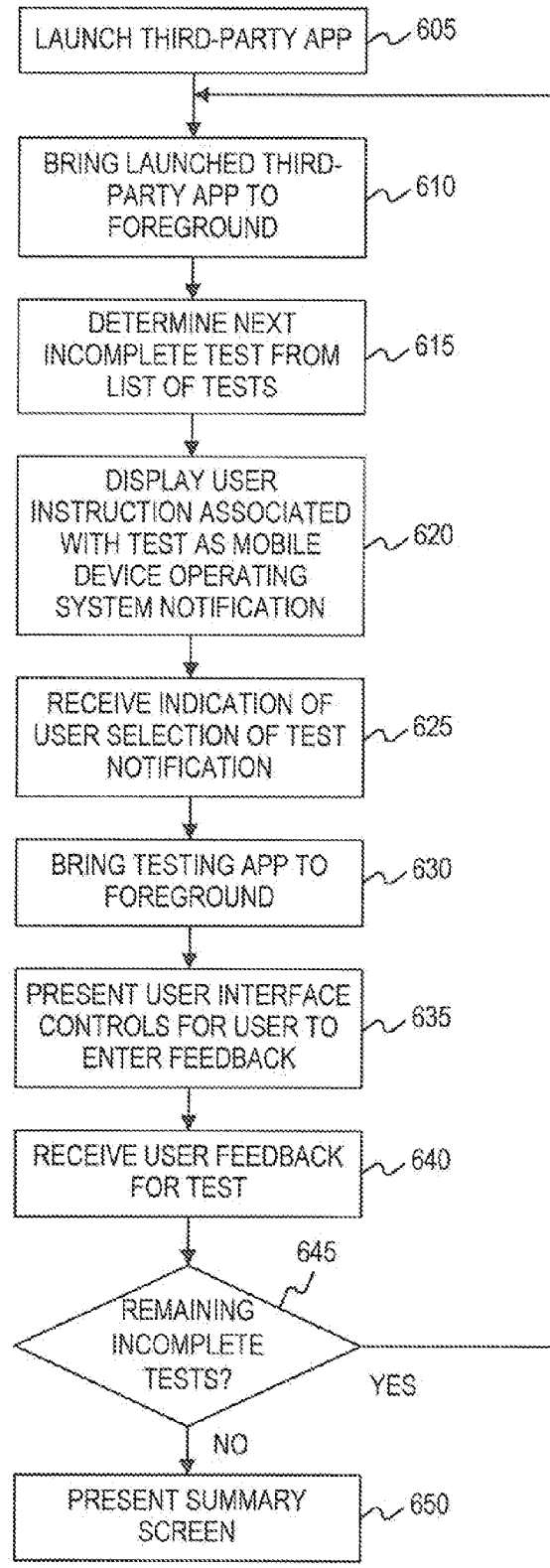
FIG. 6 is a flow diagram depicting an exemplary method of iteratively prompting a user to perform various tests associated with a particular mobile device application for testing a mobile device build, consistent with certain disclosed embodiments.
Figure 7:
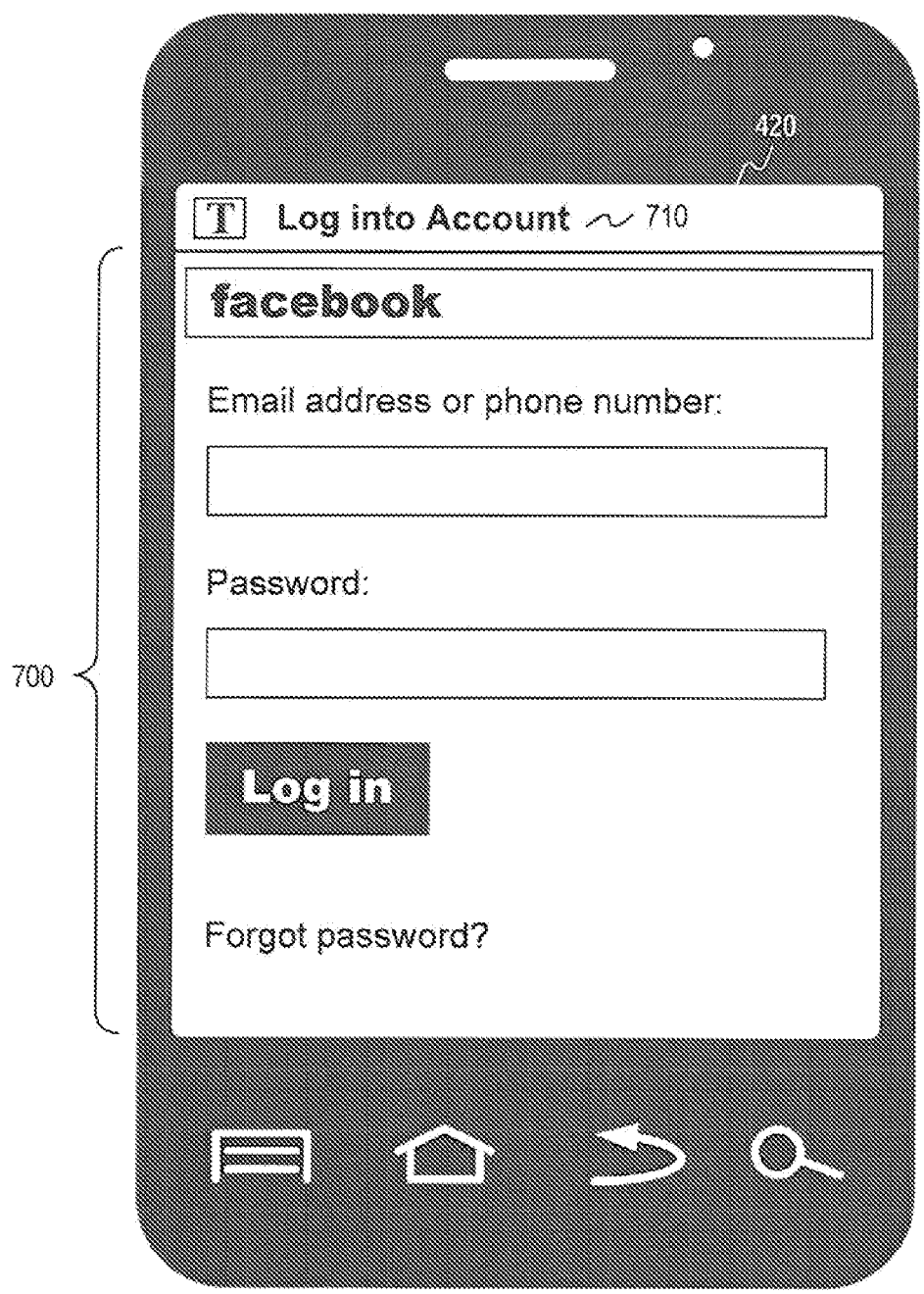
FIG. 7 is a diagram depicting an exemplary testing instruction notification while an application is executing the foreground of a mobile device, consistent with certain disclosed embodiments.

FIG. 6 is a flow diagram depicting an exemplary method of iteratively prompting a user to perform various tests associated with a particular third-party mobile app for testing a mobile device build, consistent with certain disclosed embodiments. As depicted in FIG. 6, the process of testing mobile device build 110 using testing app 400 may begin with the launching of a particular third-party app (step 605), for example in response to a user pressing button 510. Once the selected third-party app has been launched, testing app 400 may bring the launched app to the foreground (step 610), as depicted in FIG. 7.

Testing app 400 may next identify a testing operation that the user should perform using the third-party app. Thus, in step 615, testing app 400 may identify the next incomplete test from the list of tests associated with the third-party app. In step 620, testing app 400 may display an instruction associated with the test to be performed by the user.

In some embodiments, testing app 400 may display the instruction as a mobile device operating system notification. For example, as depicted in FIG. 7, mobile device 100 may display the third-party app in an area 700 of the device screen generally reserved for displaying mobile apps. Rather than obscure area 700, testing app 400 may cause a test instruction 710 to be displayed in the notification bar 420. Using this technique, the user may continue to interact with the third-party app in the foreground in a normal manner while receiving instructions from testing app 400, which may be operating in the background. Because testing app 400 provides instructions to the user through an operating system notification system—e.g., notification bar 420—the user need not bring testing app 400 to the foreground in order to receive the instructions.

In response to the notification, the user may perform the test indicated by the instruction. For example, in FIG. 7, test instruction 710 instructs the user to log into a Facebook™ account. Such an instruction may have been provided in order to test various aspects of the mobile device build, such as its ability to properly prepare and transmit communications to an application server 150, its ability to properly implement security protocols, such as secure sockets layer (SSL), etc.

Figure 8A:
FIG. 8A is a diagram depicting an exemplary state of a mobile device after a user has completed a testing operation while a testing application is executing in the background, consistent with certain disclosed embodiments.

FIG. 8 depicts mobile device 100 after the user has successfully logged into a Facebook™ account, as instructed. In some embodiments, when a notification is initially displayed in notification bar 420, it may temporarily appropriate the entire display area of notification bar 420, as depicted in FIG. 7. Subsequently, the notification may be indicated by a smaller icon 810 in the notification bar 420, as depicted in FIG. 8.

Figure 8B:
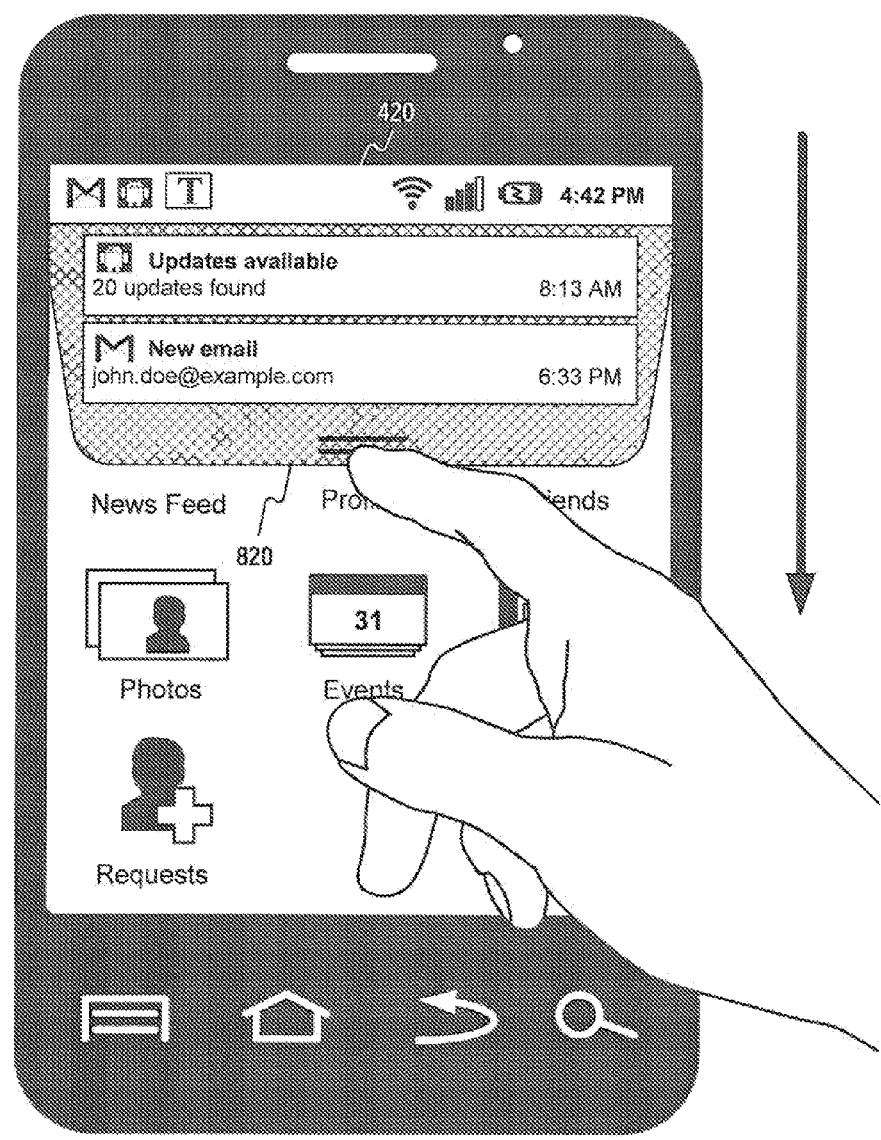
FIG. 8B is a diagram depicting an exemplary technique by which a user may select a testing instruction notification for entry of feedback, consistent with certain disclosed embodiments.

In some embodiments, the user may receive more information about, or may take action related to, a notification displayed in the notification bar by dragging, tapping, or otherwise activating the notification bar. For example, as depicted in FIG. 8B, a user may expand notification bar 420 by touching the notification bar and dragging it downward on the screen. As the notification bar is dragged downward, it may expand into a notification tray 820. FIG. 8B depicts the notification tray 820 in partial form as it is being dragged down into view.

Figure 8C:
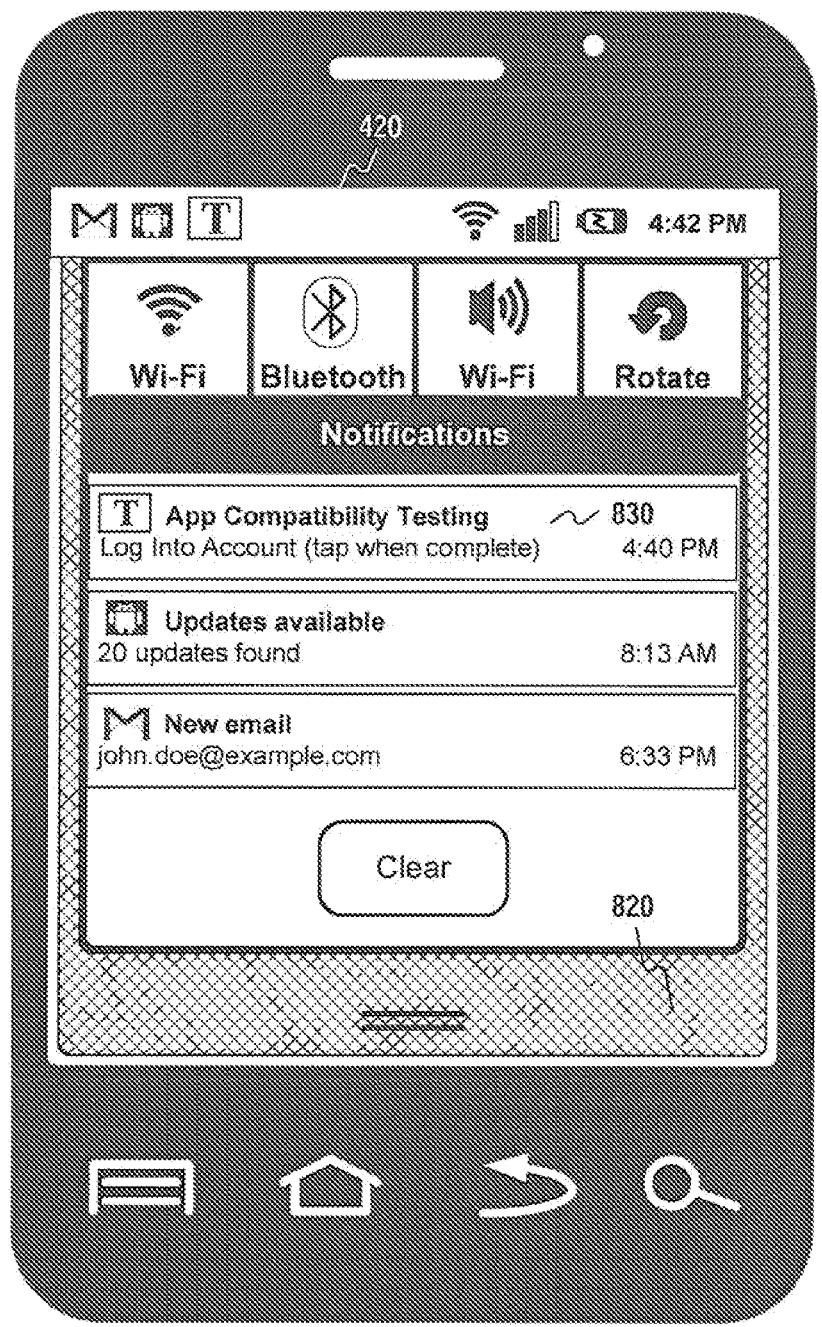
FIG. 8C is a diagram depicting an exemplary technique by which a user may select a testing instruction notification for entry of feedback, consistent with certain disclosed embodiments.

After the notification tray 820 has been dragged sufficiently downward on the screen, it may generally appropriate the foreground of mobile device 100, as depicted in FIG. 8C. Once fully displayed, notification tray 820 may display information about each notification represented by an icon in the notification bar 420. Thus, as depicted in FIG. 8C, notification tray 820 includes an area 830 associated with notification icon 820 that displays the full test instruction 710 previously displayed in notification bar 420. A user may activate notification tray 820 to view the full text of an instruction provided by testing app 400.

Alternatively, after completing a testing operation pursuant to an instruction from testing app 400, the user may activate notification tray 820 to indicate that the user has completed the operation, to provide feedback related to the operation, and/or to receive a new testing instruction. For example, as depicted in FIG. 8C, after the user has completed the testing operation indicated by instruction 810, the user may tap area 830 (step 625), in response to which mobile device 100 may bring testing app 400 to the foreground (step 630).

Figure 9:
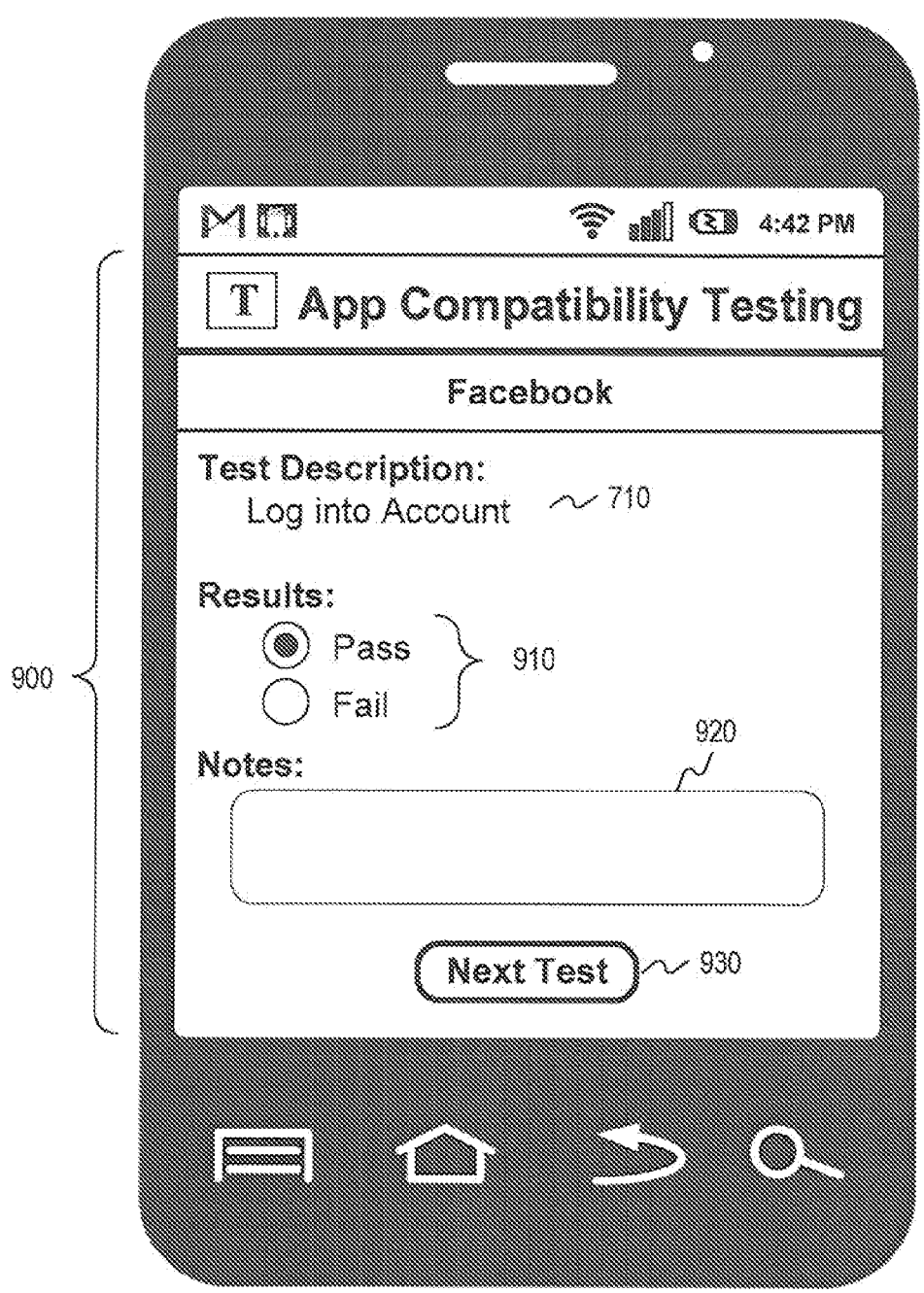
FIG. 9 is a diagram depicting an exemplary user interface in a testing application for allowing a user to enter feedback associated with a testing operation, consistent with certain disclosed embodiments.

After assuming the foreground, testing app 400 may present one or more use interface controls to the user in order to receive feedback concerning the testing operation performed by the user (step 635). Thus, as depicted in FIG. 9, testing app 400 may present a feedback screen 900 that displays the testing instruction 710 and a radio control 910 that enables the user to indicate whether the third-party app, as executed by the mobile device build, performed the testing operation successfully or as expected. In addition, feedback screen 900 may include a text area 920 into which the user can type additional information about how mobile device 100 performed the operation. The user may submit such feedback by activating a control, such as button 930, which may cause testing app 400 to receive the user's feedback for the testing operation (step 640).

In other embodiments, in response to tapping area 830, the user may be provided with the opportunity to enter feedback in a manner that does not bring testing app 400 to the foreground. For example, a dialog box may instead appear in the foreground on top of part or all of the display of the third-party app, and may provide similar controls for accepting feedback from the user.

In step 645, testing app 400 may determine whether there are any remaining tests associated with the third-party app that have not been completed. If additional incomplete tests remain (step 645, Yes), then processing may return to step 610, and steps 610 through 645 may be repeated for the next test.

Figure 10:
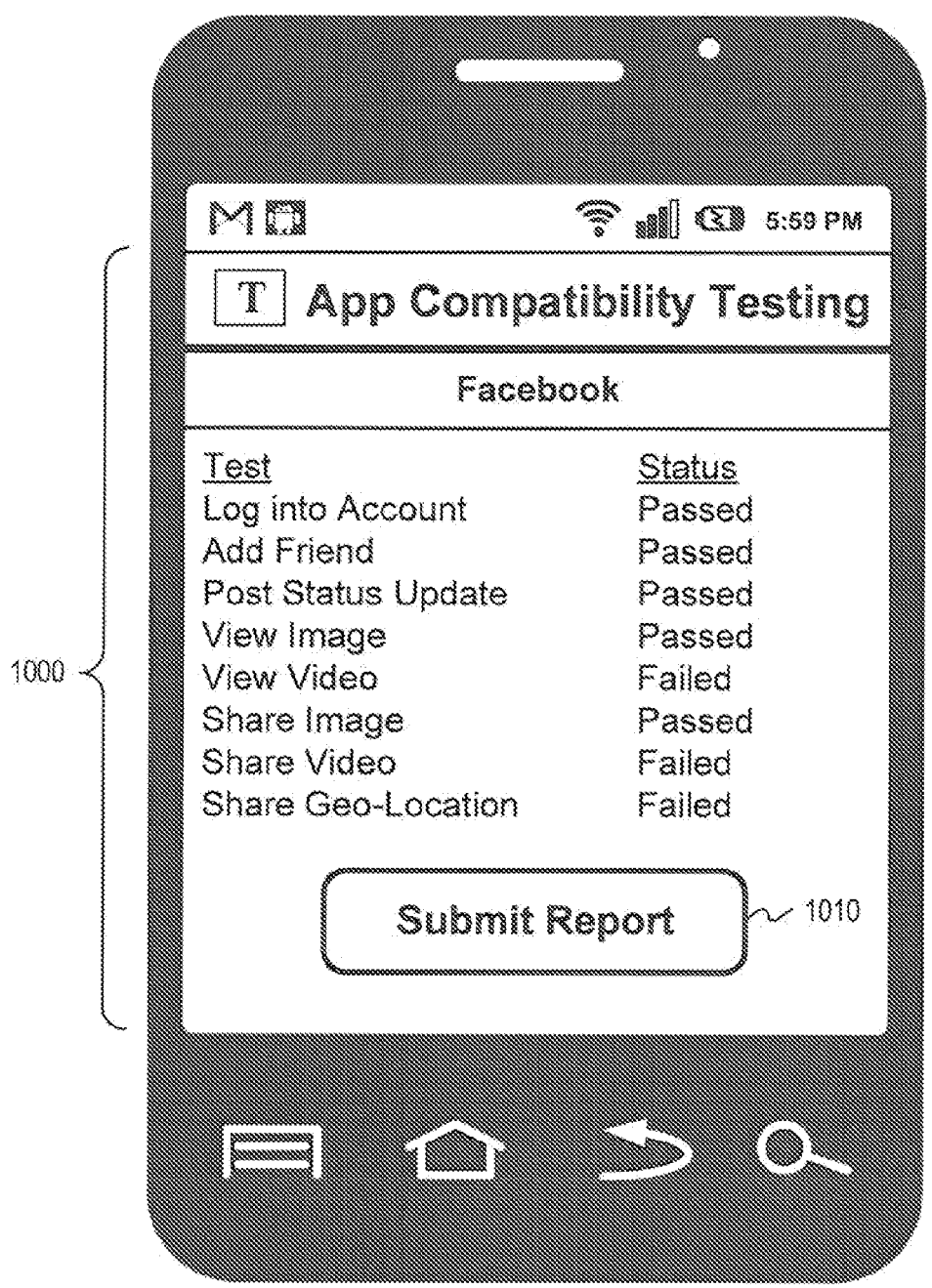
FIG. 10 is a diagram depicting an exemplary user interface in a testing application for summarizing the status of a set of tests for a mobile application for testing a mobile device build, consistent with certain disclosed embodiments.

If no additional incomplete tests remain (step 645, No), then testing app 400 may present a summary screen of the tests performed with respect to the third-party app (step 650). For example, as depicted in FIG. 10, testing app 400 may present a summary screen 1000 that indicates, for each test, whether the mobile device build passed or failed the test. Additionally, summary screen 1000 may provide functionality for allowing the user to see details concerning each testing operation, including the user's provided feedback, or to re-run the test or modify previously provided feedback. Once the user is satisfied with the information displayed on summary screen 1000, the user may submit the testing information associated with the third-party app to testing server 130, for example by activating button 1010.

Returning to FIG. 2, after all tests have been performed for a given third-party app in a downloaded app suite, mobile device 100 may submit the collected test data to testing server 130 (step 250). Such data may be submitted individually for each third-party app or collectively.

Next, an entity such as the software vendor that distributes mobile device operating system 115 may determine whether mobile device build 110 passed the necessary tests for all third-party apps included in the app suite (step 260). If the necessary tests were passed (step 260, Yes), then the software vendor may certify that the mobile device build meets one or more standards (step 270). For example, the mobile device build may be required to meet one or more standards before it is permitted full access to a mobile device app marketplace portal provided by the software vendor or associated entities. Or, the mobile device build may be required to meet one or more standards before the mobile device-maker is permitted to brand the mobile device using one or more trademarks. Those skilled in the art will appreciate other ways in which the software vendor may require compliance with one or more standards as a condition to granting the mobile device build certain rights or privileges, whether technological or business-related in nature.

If not all of the necessary tests were passed (step 260, No), then the device-maker may proceed to modify the mobile device build in order to address the deficiencies identified through testing (step 280). For example, the device-maker may modify one or more aspects of the hardware architecture 112 associated with mobile device 100 and/or may debug one or more modifications 117 that it made to the operating system version 116 obtained from the software vendor.

Once such deficiencies have been addressed, the modifications may be compiled or deployed, thus resulting in a new mobile device build. The device-maker may then register the new build with testing server 130 (step 210), and may test the new build using steps 220 through 250, as described above. In some embodiments, the device-maker may continue to create and test new mobile device builds until all necessary tests have been passed and the mobile device build is certified as compliant with one or more standards.

Figure 11:
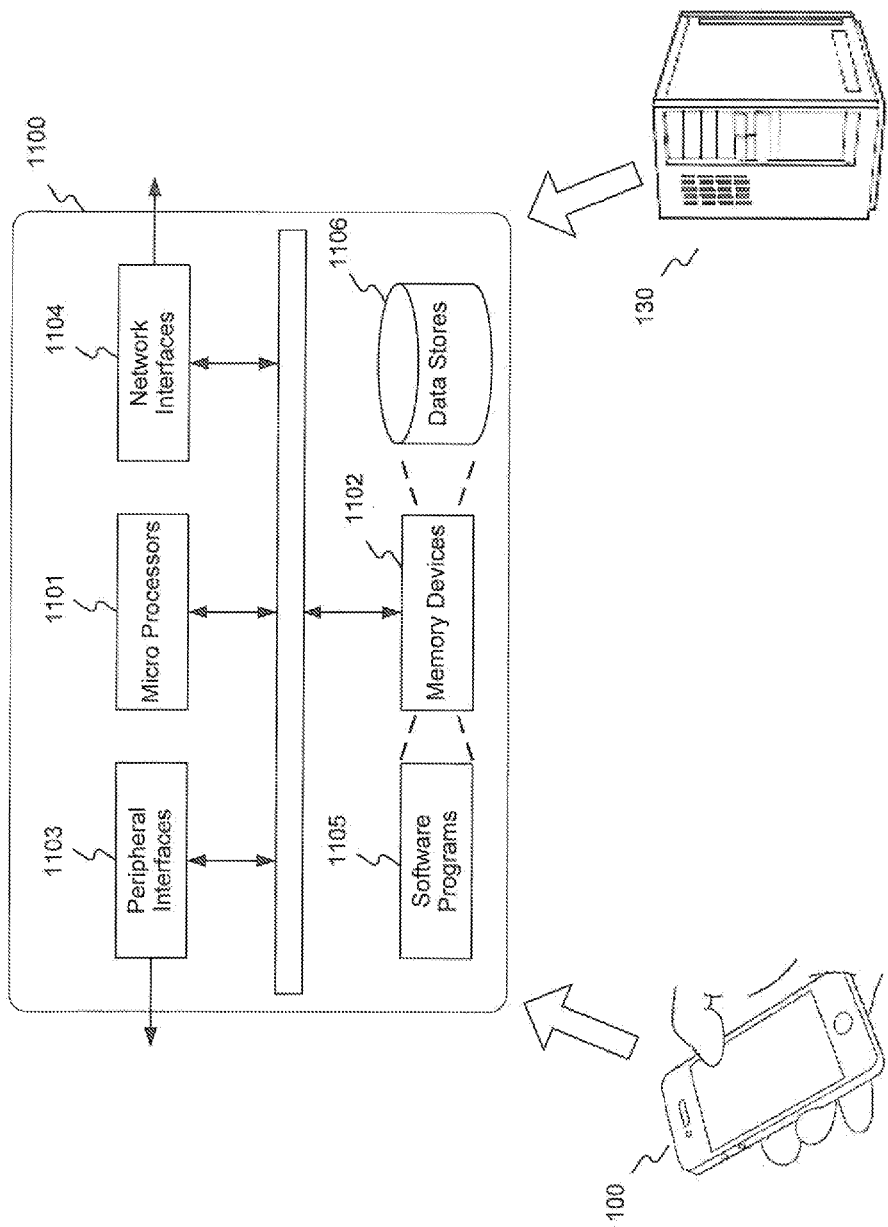
FIG. 11 is a diagram depicting an exemplary hardware configuration of a mobile device and/or a testing server, consistent with certain disclosed embodiments.

FIG. 11 is a diagram depicting an exemplary hardware configuration 1100 for mobile device 100 and/or testing server 130. Hardware configuration 1100 may include one or more microprocessors 1101 of varying core configurations and clock frequencies; one or more memory devices or computer-readable media 1102 of varying physical dimensions and storage capacities, such as flash-drives, hard drives, random access memory, etc., for storing data, such as files, images, and/or program instructions for execution by one or more microprocessors 1101; one or more network interfaces 1104, such as Ethernet adapters, wireless transceivers, or serial network components, for communicating over wired or wireless media using protocols, such as Ethernet, wireless Ethernet™, GSM, WiMAX™, etc.; and one or more peripheral interfaces 1103, such as keyboards, mice, touchpads, computer screens, touchscreens, etc., for enabling human interaction with and manipulation of mobile device 100 and/or testing server 130. In some embodiments, the components of hardware configuration 1100 need not be enclosed within a single enclosure or even located in close proximity to one another.

Memory devices 1102 may further be physically or logically arranged or configured to provide for or store one or more data stores 1106, such as one or more file systems or databases, and one or more software programs 1105, which may contain interpretable or executable instructions for performing one or more of the disclosed embodiments. For example, software programs 1105 may include mobile device operating system 115, device-maker modifications 117, carrier software 118, testing app 400, and/or various third-party apps. Those skilled in the art will appreciate that the above-described componentry is exemplary only, as mobile device 100 and/or testing server 130 may comprise any type of hardware componentry, including any necessary accompanying firmware or software, for performing the disclosed embodiments. Hardware configuration 1100 may also be implemented in part or in whole by electronic circuit components or processors, such as application-specific integrated circuits (ASICs) or field-programmable gate arrays (FPGAs).

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Those skilled in the art will recognize that these and other variations are possible within the spirit and scope as defined in the following claims and their equivalents.

What is claimed is:

1. A method of testing performance of a mobile device defined by a mobile device build, the method comprising:
   executing a testing application on the mobile device, wherein executing the testing application comprises:
   identifying a mobile device build for the mobile device;
   identifying a set of mobile applications designated for testing the mobile device build, wherein the set of mobile applications is associated with a collective set of tests that specify a collective set of actions that must be performed correctly by the mobile device in order for the mobile device build to be certified as compatible with one or more standards;
   for each mobile application in the set of mobile applications:
   receiving an indication that the mobile application has been selected for execution;
   identifying a set of tests associated with the mobile application;
   for each test in the set of tests:
   prompting a user to perform an action specified by the test using the mobile application;
   prompting the user for feedback regarding performance of the action by the mobile application;
   receiving the feedback from the user; and
   storing the feedback received from the user.

2. The method of claim 1, wherein executing the testing application further comprises:
   retrieving a list of the set of mobile applications designated for testing the mobile device build from a testing server; and
   displaying the list to the user.

3. The method of claim 2, wherein executing the testing application further comprises:
   upon receiving an indication that the user has selected a mobile application from the list, directing the user to an external software portal from which the mobile application is operable to be downloaded to the mobile device.

4. The method of claim 3, wherein executing the testing application further comprises:
   determining that the user has downloaded and installed the mobile application; and
   presenting the user with an option of executing the mobile application.

5. The method of claim 1, wherein executing the testing application further comprises:
   upon receiving an indication that the user has selected a mobile application for execution from among the set of mobile applications:
   causing the selected mobile application to execute on the mobile device in a foreground of a graphical user interface display of the mobile device; and
   causing the testing application to simultaneously execute on the mobile device in a background of the graphical user interface display of the mobile device.

6. The method of claim 5, wherein prompting the user to perform the action specified by the test comprises:
   displaying an instruction to perform the action within a dialog box overlaying the foreground, while continuing to execute the testing application in the background.

7. The method of claim 5, wherein prompting the user to perform the action specified by the test comprises:
   displaying an instruction to perform the action as a notification using a notification system provided by an operating system of the mobile device build that is independent of the execution of the testing application and the mobile application.

8. The method of claim 7, wherein displaying the instruction using the notification system comprises:
   displaying the instruction or an icon representing the instruction in a system status bar that also displays one or more of a current time, battery status, or signal strength of the mobile device.

9. The method of claim 7, wherein executing the testing application further comprises:
   in response to receiving an indication of a selection of the notification by the user, presenting a dialog box overlaying the foreground; and
   receiving the feedback from the user through the dialog box.

10. The method of claim 7, wherein executing the testing application further comprises:
- in response to receiving an indication of a selection of the notification by the user, causing the testing application to execute in the foreground; and
- receiving the feedback from the user through one or more graphical user interface components provided by the testing application.

11. The method of claim 10, wherein executing the testing application further comprises:
- in response to receiving the feedback from the user, causing the mobile application to execute in the foreground; and
- prompting the user to perform a subsequent action specified by a subsequent test using the mobile application.

12. The method of claim 2, wherein executing the testing application further comprises:
- transmitting the stored feedback to the testing server.

13. The method of claim 1, wherein executing the testing application further comprises:
- receiving, from a testing server, one or more of the set of mobile applications designated for testing the mobile device build; and
- installing the one or more of the set of mobile applications on the mobile device.

14. A non-transitory computer readable medium comprising instructions for causing one or more processors of a mobile device to perform a method comprising:
- identifying a set of mobile applications designated for testing a mobile device build, wherein the set of mobile applications is associated with a collective set of tests that specify a collective set of actions that must be performed correctly by the mobile device in order for the mobile device build to be certified as compatible with one or more standards;
- for each mobile application in the set of mobile applications:
  - receiving an indication that the mobile application has been selected for execution;
  - identifying a set of tests associated with the mobile application;
  - for each test in the set of tests:
    - prompting a user to perform an action specified by the test using the mobile application;
    - prompting the user for feedback regarding performance of the action by the mobile application;
    - receiving the feedback from the user; and
    - storing the feedback received from the user.

15. The non-transitory computer readable medium of claim 14, wherein executing the testing application further comprises:
- upon receiving an indication that the user has selected a mobile application for execution from among the set of mobile applications:
  - causing the selected mobile application to execute on the mobile device in a foreground of a graphical user interface display of the mobile device; and
  - causing the testing application to simultaneously execute on the mobile device in a background of the graphical user interface display of the mobile device.

16. A system for testing performance of a mobile device defined by a mobile device build, comprising:
- a memory storing instructions; and
- one or more processors coupled to the memory and configured to execute the instructions to perform a method comprising:
  - generate a testing application to test performance of the mobile device build, wherein the testing application:
    - specifies a set of mobile applications designated for testing the mobile device build,
    - specifies a set of tests associated with each mobile application in the set of mobile applications, and
    - provides feedback regarding performance of actions specified by the set of tests;
  - providing, to the mobile device, the testing application to be executed on the mobile device; and
  - receiving, from the testing application, the feedback regarding the performance of actions specified by the set of tests,
- wherein the actions specified by the set of tests must be performed correctly by the mobile device in order for the mobile device build to be certified as compatible with one or more standards.

17. The system of claim 16, the method performed by the one or more processors further comprises:
- providing one or more of the set of mobile applications to the mobile device.

18. The method of claim 1, wherein each mobile device build identifies a particular set of hardware and software characteristics for the mobile device.

19. The method of claim 1, wherein each test is operable to measure performance of the associated mobile application for the mobile device build of the mobile device.

* * * * *